United States Patent Office 3,082,249
Patented Mar. 19, 1963

3,082,249
SODIUM 3-TRIDECYLOXY-2-PROPANOL-1-SULFONATE
Van R. Gaertner, Dayton, Ohio, assignor to Monsanto Chemical Company, St. Louis, Mo., a corporation of Delaware
No Drawing. Filed May 13, 1958, Ser. No. 734,849
1 Claim. (Cl. 260—513)

This invention relates to surface-active agents and more particularly provides alkali metal salts of branched-chain 3-tridecyloxy-2-hydroxy-1-propanesulfonates which possess a high degree of utility as surfactants.

The present alkali metal salts are readily prepared according to the invention by the reaction of a branched-chain 1-chloro-3-tridecyloxy-2-propanol with an alkali metal sulfite in an alkaline medium substantially according to the scheme

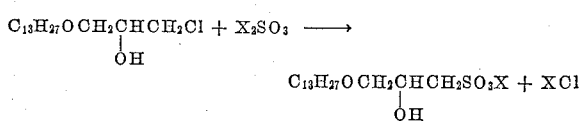

wherein $C_{13}H_{27}$ denotes the tridecyl radical derived from a branched-chain tridecanol obtained by the reaction of carbon monoxide and hydrogen with a hydrocarbon selected from the class consisting of triisobutylene and tetrapropylene, and X denotes alkali metal. Alkali metal sulfites which are presently useful are sodium, potassium and lithium sulfites.

The presently employed 1-chloro-3-tridecyloxy-2-propanol may be conveniently obtained by the reaction of "Oxo" process tridecanol with 1-chloro-2,3-epoxypropane. Depending upon the reaction conditions, there may be formed, together with the 1-chloro-3-tridecyloxy-2-propanol, a minor amount of the isomeric 2-chloro-3-tridecyloxy-1-propanol. For the purpose of this invention, the presence or absence of the isomeric 2-chloro-3-tridecyloxy-1-propanol is unimportant, since the alkali metal sulfite treatment also converts this isomer to the desired alkali metal branched-chain 3-tridecyloxy-2-hydroxy-1-propanesulfonate by reason of an intermediately formed branched-chain tridecyl glycidyl ether which adds to the sulfite to give said 2-hydroxy compound. An alternative method of preparing the present 3-tridecyloxy-2-hydroxy-1-propanesulfonate thus comprises preparation of the tridecyl glycidyl ether by dehydrohalogenation of either 1-chloro-3-tridecyloxy-2-propanol or 2-chloro-3-tridecyloxy-1-propanol, e.g., as disclosed in my copending application, Serial No. 734,850, filed of even date, now Patent No. 2,965,652, and reaction of said tridecyl glycidyl ether with sodium sulfite to give the 3-tridecyloxy-2-hydroxy-1-propanesulfonate; thus:

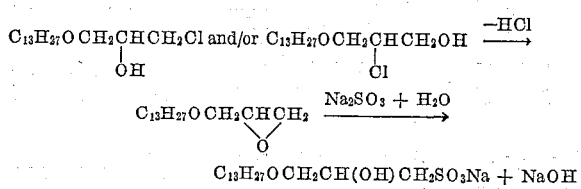

Reaction of the tridecyl glycidyl ether with the alkali metal sulfite is advantageously effected while substantially neutralizing the by-product alkali metal hydroxide as it is formed. This may be done by gradual addition of acid to the reaction mixture at a rate to maintain the pH thereof at, say, from 6 to 8. The reaction is also advantageously conducted in the presence of an extraneous diluent or solvent, e.g., ethanol, isopropanol, hexane, etc. The alkali metal 2-hydroxy-3-tridecyloxy-1-propanesulfonate may be recovered from the reaction product by distillation to remove solvent and any unreacted material or preferably by azeotropic distillation, e.g., with benzene or xylene, whereby the dried product is obtained.

In effecting condensation of the tridecyloxychloropropanol with the alkali metal sulfite, I prefer to operate substantially as follows:

Said chloropropanol is added, with stirring, to an aqueous solution of the sulfite in the presence of an alkaline material as catalyst, and the resulting reaction mixture is stirred at ordinary or increased temperatures until the formation of the present sulfonate has occurred. Refluxing temperatures are advantageously employed. The reaction may be effected at ordinary, super-atmospheric or sub-atmospheric pressures. When the addition reaction has been completed, which can be ascertained by noting cessation in change of color of an acid-base indicator and lack of turbidity, the sulfonate product is readily recovered by customarily employed isolating procedures, i.e., by filtration to remove by-product and unreacted material, solvent extraction, etc. A product of good purity is obtained by solvent extraction, e.g., the product may be taken up in a liquid which is a solvent for the sulfonate and a non-solvent for any inorganic material which may be present, the resulting solution filtered and the solvent removed from the filtrate by volatilization. Solvents which may be employed for this purpose are, e.g., hot methanol, ethanol, isopropanol, ether, etc. Alternatively, the reaction mixture may be worked up by allowing it to stratify, recovering the water layer, and freeing it of inorganic salts by distilling it with a lower alkanol, e.g., isopropanol.

Alkaline materials which are useful for effecting condensation of the tridecyloxychloropropanol with the alkali metal sulfites are preferably water-soluble inorganic alkalies such as the alkali metal hydroxides and basic salts thereof, e.g., sodium, potassium or lithium hydroxides or carbonates. Basically reacting salts of organic acids, e.g., sodium acetate or the alkali metal alcoholates such as sodium methoxide may also be employed. The presently useful alkali metal sulfites include the sodium, potassium and lithium sulfites, whereby there are obtained the sodium, potassium, or lithium 3 - tridecyloxy - 2 - hydroxy-1-propanesulfonates.

As will be shown hereafter, the present alkali metal branched-chain 3 - tridecyloxy-2-hydroxy-1-propanesulfonates possess exceptionally good wetting-out, detersive and foaming properties. I have found that they are particularly valuable as detersive stocks in bar-soap manufacture in that they can be molded either in the presence or absence of fillers to give hard bars which possess good cleansing and lathering action throughout the life of the bar.

The present invention is further illustrated, but not limited, by the following examples:

*Example 1*

An aqueous solution of sodium sulfite was prepared by adding 8.0 g. (0.2 mole) of sodium hydroxide pellets to a solution of 19.0 g. of sodium metabisulfite in 100 ml. of water. The resulting aqueous solution of sodium sulfite was brought to a pH of above 9.0 by adding thereto 2.0 ml. of 40% sodium hydroxide and 100 ml. of ethanol. To the resulting alkaline solution of the sulfite there was then added 52.5 g. (0.179 mole) of branched-chain 1-chloro-3-tridecyloxy-2-propanol wherein the tridecyl radical was derived from a branched-chain tridecanol obtained by the reaction of carbon monoxide and hydrogen with tetrapropylene. The whole was then brought to reflux, stirred, and maintained at this temperature for one hour, whereupon another 2.0 ml. portion of 40% aqueous sodium hydroxide was added. Refluxing and stirring were continued for about 12 more hours. At the end of that time, the pH of the reaction mixture was adjusted to 7.0 by addition of dilute aqueous hydrochloric acid. After filtering, the filtrate was dried by stripping off the water at reduced pressure while replacing it with isopropanol. Upon standing, the sodium branched-chain 3-tridecyloxy-2-hydroxypropanesulfonate separated from the residue. It was oven-dried to give a white, granular solid.

*Example 2*

To 88 g. (0.30 mole) of a mixture consisting predominantly of the branched-chain 1-chloro-3-tridecyloxy-2-propanol described in Example 1 and a minor amount of 2-chloro-3-tridecyloxy-1-propanol there was added 46 g. (0.33 mole) of sodium sulfite, 100 ml. of water, and 100 ml. of ethanol. The resulting mixture was heated to a temperature of 85° C. while 40% aqueous sodium hydroxide was added thereto to a pH of 9. The whole was refluxed for 24 hours, at the end of which time, the reaction mixture was a clear solution. After neutralizing, it was dried by stripping off the water and ethanol while replacing them with isopropanol. The small amount of solid which had formed during the drying was filtered off and the filtrate diluted with about one liter of acetone. The gummy solid which precipitated out was recovered, washed with acetone and dried first at room temperature and then by heating it at 40° C. in a vacuum oven. There was thus obtained 75.7 g. of the white solid sodium salt of the branched-chain sodium 3-tridecyloxy-2-hydroxypropanesulfonate. Another 4.0 g. of the salt was obtained by working up the mother liquors.

*Example 3*

A mixture consisting of 91.5 g. of branched-chain (Oxo process) tridecyl glycidyl ether, 50.4 g. (0.40 mole) of sodium sulfite, 100 ml. of water, 100 ml. of ethanol and phenolphthalein as indicator was heated for 8 hours at 80–85° C. while there was added thereto, dropwise, 6 N hydrochloric acid at a rate just sufficient to maintain the reaction mixture at a pH of 6 to 8. No significant change in pH was noted during the last 2 hours of heating. The reaction mixture was then cooled to about 50° C., stirred with 300 ml. of benzene, and filtered. Azeotropic distillation of the filtrate with removal of the lower layer of distillate gave a final residue of a solution of the product in benzene, together with suspended salts. This was filtered and the filtrate concentrated to 200 ml. Treatment of the cooled, concentrated material with 800 ml. of acetone caused the product to separate in finely divided, semi-crystalline form. It was filtered off, washed three times with acetone, comminuted and dried overnight in the vacuum oven at below 50° C. at full aspirator vacuum. There was thus obtained 99.2 g. of the substantially pure sodium 2-hydroxy-3-tridecyloxy-1-propanesulfonate.

*Example 4*

The wetting-out efficiencies of the sodium 3-tridecyloxy-2-hydroxy-1-propanesulfonate of Example 1 and of several other 3-alkyloxy-2-hydroxy-1-propanesulfonates were determined by the Draves test of the American Association for Testing Materials. The following results were obtained:

| $ROCH_2CH(OH)CH_2SO_3Na$ where R= | Wetting Speed—Draves Method Seconds at percent concentration | |
|---|---|---|
| | 0.5 | 0.25 |
| branched-chain tridecyl [1] | Inst. | 3.9 |
| n-dodecyl | too turbid | for testing |
| n-tridecyl | 13.1 | 14.2 |
| branched-chain decyl [1] | 2.6 | 17.4 |
| branched-chain hexadecyl [1] | 4.3 | 8.2 |

[1] The tridecyl, decyl and hexadecyl radicals are derived respectively from either branched-chain decanol, branched-chain tridecanol or branched-chain hexadecanol obtained according to the "Oxo" process by the high temperature, high pressure reaction of carbon monoxide and hydrogen with propylene trimer in the case of the decyl radical, with either propylene tetramer or butylene trimer in the case of the tridecyl radical and propylene pentamer in the case of the hexadecyl radical.

*Example 5*

A built detersive composition comprising the sodium branched-chain 3-tridecyloxy-2-hydroxypropanesulfonate of Example 2 was formulated by incorporating 15% by weight of said sulfonate with 40 parts by weight of a mixture of sodium tripolyphosphate and sodium tetrapyrophosphate, 20% soda ash and 25% sodium silicate. Detersive efficiency of the built composition was tested by the method described by J. C. Harris and Earl L. Brown in the Journal of American Oil Chemists' Society, 27, 135–143 (1950), in which method the detergency of materials is compared with the detergency of Gardinol WA, a commercial detergent produced by sulfating the mixture of alcohols, principally $C_{12}$, obtainable by hydrogenation of coconut oil fatty acids. The present built composition, when submitted to this test, gave a detersive efficiency of 107% of Gardinol in water of 300 p.p.m. hardness.

*Example 6*

The sodium branched-chain 3-tridecyloxy-2-hydroxypropanesulfonate, of Example 2 was tested for lathering properties by the Ross-Miles lather test of the American Society for Testing Materials. In water of 300 p.p.m. hardness, 24.0 cm. was obtained at once and the value fell only to 23.4 cm. after 5 minutes.

What I claim is:
A product of the formula

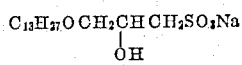

in which $C_{13}H_{27}$ denotes the tridecyl radical derived from a branched-chain tridecanol obtained according to the "Oxo" process by the high temperature, high pressure reaction of carbon monoxide and hydrogen with tetrapropylene.

References Cited in the file of this patent

UNITED STATES PATENTS

| 2,094,489 | Hueter et al. | Sept. 28, 1937 |
| 2,934,568 | Barker | Apr. 26, 1960 |
| 2,965,678 | Sundberg et al. | Dec. 20, 1960 |

FOREIGN PATENTS

| 719,445 | Great Britain | Dec. 1, 1954 |
| 315,882 | Switzerland | Sept. 15, 1956 |

OTHER REFERENCES

Hatch: Higher Oxo Alcohols, Enjay Co. Inc., 1957 (especially chapter 5).